July 5, 1955
H. J. JUEDEMAN
2,712,331
SLICING SAW CUTTING HEAD
Filed Aug. 15, 1952
2 Sheets-Sheet 1
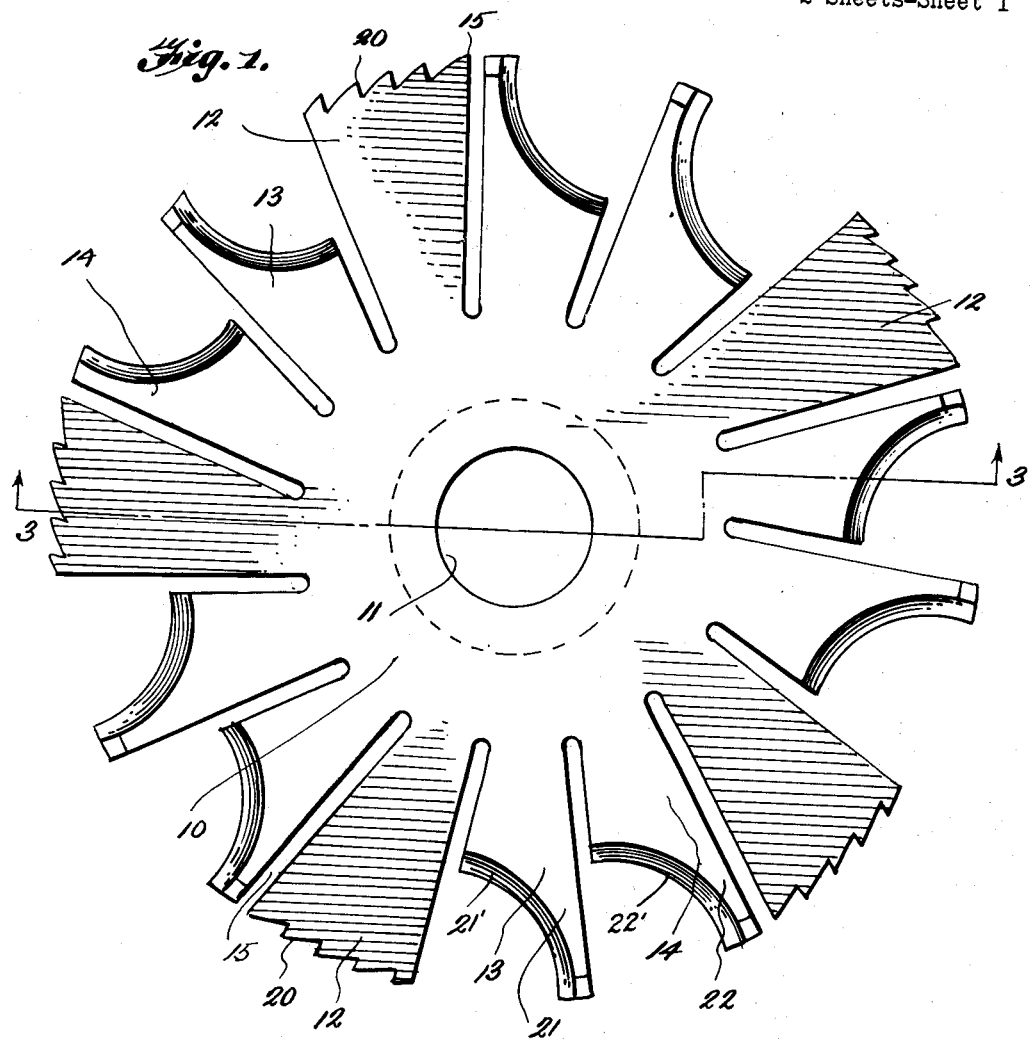
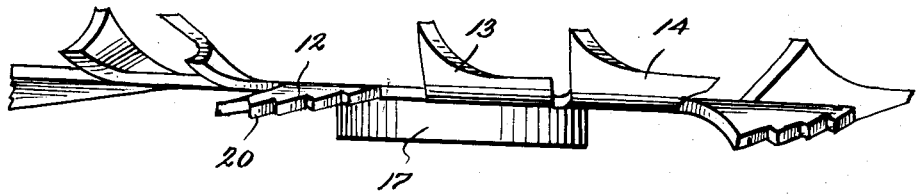
INVENTOR.
HENRY J. JUEDEMAN
BY Patrick D. Beavers
ATTORNEY

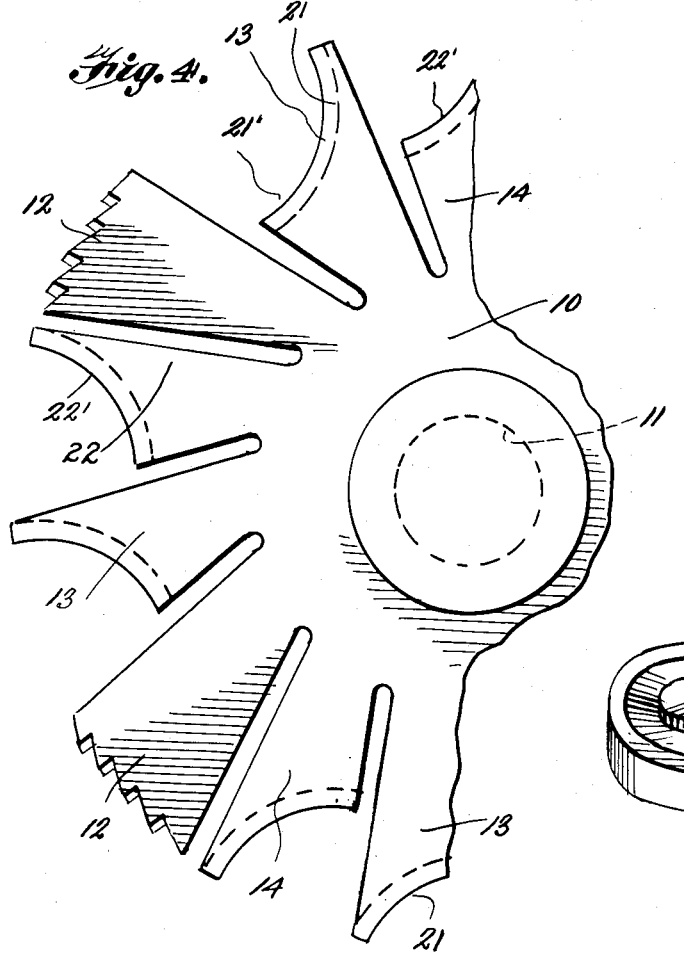

United States Patent Office 2,712,331
Patented July 5, 1955

2,712,331
SLICING SAW CUTTING HEAD
Henry J. Juedeman, Junction City, Kans.

Application August 15, 1952, Serial No. 304,480

1 Claim. (Cl. 144—222)

This invention relates to a slicing saw cutting head.

It is an object of the present invention to provide a slicing saw cutting head which will provide automatically on the edge of a frame formed of plywood a rounded and outwardly chamfered edge without the need for hand planing and also an edge which makes unnecessary the use of sand paper thereafter to bring a smooth surface thereon.

It is another object of the invention to provide a slicing saw cutting head which can be applied to any rotary saw machine which will make a clean cut on the side edges of cabinet doors and wherein there is provided interposed between saw cutting projections on the rotary head inwardly twisted cutting projections having rounded cutting edges to effect a shaving and planing action upon the side edge of the cabinet piece.

Other objects of the invention are to provide a slicing saw cutting head, which is for the purpose of cutting rounded edges upon cabinet frame pieces, which is of simple construction, inexpensive to manufacture, operable at high speed with maximum and quick cutting action and efficient in use and in operation.

For a better understanding of the invention reference may be had to the following detailed description taken in connection with the accompanying drawing, in which:

Figure 1 is a plan view of the slicing saw cutting head embodying the features of the present invention;

Fig. 2 is an edge elevational view of the slicing saw cutting head;

Fig. 3 is a transverse sectional view of the saw cutting head;

Fig. 4 is a fragmentary plan view of the saw cutting head looking on the surface thereof and in the opposite direction of that shown in Fig. 1;

Fig. 5 is a perspective view of the spacing washer for saws which have the shaft on the left side as one faces the saw.

Referring now to the figures, 10 represents a saw cutting head body having a central hole opening 11 by which the saw is attached to the driving shaft in the usual manner. Extending substantially radially of this saw body are a plurality of projections 12, 13 and 14 arranged in sets and there being five sets surrounding the body. These projections are provided by a cutting of a plurality of circumferentially spaced slots 15 about the circumference of the saw head. These slots extend substantially radially and have a length of substantially one-half the radial dimensions of the head.

If the saw cutting head is used on a saw machine where the cutting head shaft extends to the left side of the machine as one faces it, a spacer member 17 having an axial projection 18, Fig. 5, is disposed on the cutting head. This projection 18 is of the diameter of the center hole 11 so as to prevent relative radial displacement of the spacer member with respect to the cutting head.

The projection 12 has on its periphery a set of the usual saw cutting teeth 20 so that a cutting action is effected with them. The projection 12 is slightly skewed so that a wide saw cut is effected with this projection 12 by the cutting teeth 20. The projection 13 is heavily skewed and twisted in a reverse direction to the projection 12 and has a cut away portion 21 facing the trailing edge of the projection 12. This portion 21 has a sharp cutting edge 21' rounded in two planes so as to take a slicing and shaving cut upon the cabinet frame piece.

The projection 14 has a similar cut away portion 22 and a cutting edge thereon as indicated at 22' and so that a succeeding shaving cut is made. The curvature of these cutting edges is such that one cutting edge will act upon one part or portion of the edge of the work piece while the other cutting edge will act upon another part of the edge of the work piece.

Because the projection 12 with its usual saw cutting teeth thereof is twisted, a shoulder will be cut into the edge of the work piece. At the same time the other face of the work piece will be rounded in a manner such that it is smooth and will not need sanding. This tool is particularly adaptable for use upon the edges of plywood.

The cutting edges 21' and 22' are sharpened on the side of the projection at the front of the cutting head. These cutting edges are of substantial length and will cut smooth and with a shaving-like action upon the work piece edge. These cutting edges are rearwardly and outwardly curved from the projections 12 and from the direction of rotation of the cutting head.

It should now be apparent that there will be cut on a work piece edge, a rounded outer surface and as well a recess for receiving the glass piece of a cabinet door. This is all done with one saw cutting operation.

While various changes may be made in the detail arrangement of the saw tooth projections of this cutting head, it shall be understood that such changes shall be within the spirit and scope of this invention, as defined by the appended claim.

What is claimed is:

A slicing saw cutting head comprising a central body having an opening therein for the attachment of the body to a shaft, and radially extending cutting projections extending outwardly from the body portion and arranged in sets, one projection of each set having saw teeth thereon, the succeeding projections of each set having arcuate cutaway portions at their outer or peripheral edges and being twisted out of the plane of the body portion and providing cutting edges serving to make a rounded cut on a work piece, said projection having the saw teeth formations thereon lies partially in the plane of the body and extends outwardly from such body plane on one side thereof, and the remaining projections being twisted and lying fully without the plane of the body on the opposite side thereof with respect to the projection having the saw teeth.

References Cited in the file of this patent
UNITED STATES PATENTS

| Number | Name | Date |
|---|---|---|
| 552,573 | Baar | Jan. 7, 1896 |
| 501,956 | Nelson | July 26, 1893 |
| 514,207 | Bott | Feb. 6, 1897 |
| 964,602 | Aldridge | July 19, 1910 |
| 1,033,380 | Burke | July 23, 1912 |
| 1,315,734 | Mattison | Sept. 9, 1919 |
| 2,061,237 | Karle | Nov. 17, 1936 |